United States Patent
Yi et al.

(10) Patent No.: US 11,055,878 B2
(45) Date of Patent: Jul. 6, 2021

(54) PERSON COUNTING METHOD AND PERSON COUNTING SYSTEM

(71) Applicants: Hong Yi, Beijing (CN); Haijing Jia, Beijing (CN); Weitao Gong, Beijing (CN); Wei Wang, Beijing (CN)

(72) Inventors: Hong Yi, Beijing (CN); Haijing Jia, Beijing (CN); Weitao Gong, Beijing (CN); Wei Wang, Beijing (CN)

(73) Assignee: RICOH COMPANY, LTD., Tokyo (JP)

( * ) Notice: Subject to any disclaimer, the term of this patent is extended or adjusted under 35 U.S.C. 154(b) by 83 days.

(21) Appl. No.: 16/655,496

(22) Filed: Oct. 17, 2019

(65) Prior Publication Data
US 2020/0134875 A1 Apr. 30, 2020

(30) Foreign Application Priority Data

Oct. 24, 2018 (CN) .......................... 201811243215.0

(51) Int. Cl.
*G06K 9/00* (2006.01)
*G06T 7/00* (2017.01)
*G06K 9/62* (2006.01)

(52) U.S. Cl.
CPC ............ *G06T 7/97* (2017.01); *G06K 9/00369* (2013.01); *G06K 9/00771* (2013.01);
(Continued)

(58) Field of Classification Search
CPC ............ G06T 7/97; G06T 2207/10016; G06T 2207/30196; G06T 2207/30242; G06T 2207/20081; G06T 2207/20084; G06T 2207/30232; G06T 7/248; G06T 7/0002; G06K 9/6215; G06K 9/00369;
(Continued)

(56) References Cited

U.S. PATENT DOCUMENTS

2014/0226877 A1* 8/2014 Je .................... G06K 9/00926
382/118
2015/0304570 A1* 10/2015 Takahashi .......... G06K 9/00369
348/159

FOREIGN PATENT DOCUMENTS

JP 2005-234974 * 9/2005 ............... G06T 7/00
JP 2018-106282 * 7/2018 ............... G06T 1/00

OTHER PUBLICATIONS

D. Hernandez, People counting with re-identification using depth cameras, SIANI, Universidad de Las Palmas de Gran Canaria, Spain, pp. 1-6) (Year: 2017).*

* cited by examiner

*Primary Examiner* — Amara Abdi
(74) *Attorney, Agent, or Firm* — Harness, Dickey & Pierce, P.L.C.

(57) ABSTRACT

A person counting method and a person counting system are provided. The method includes extracting a group of person images to obtain a first image set; dividing the first image set into first and second subsets based on whether a related image exists in a second image set, and reusing a person ID of the related image; estimating posture patterns of images in the first subset, and storing the images in the first subset into an image library based on person IDs and the posture patterns; and selecting a target image whose similarity to an image in the second subset is highest from the image library, reusing a person ID of the target image when the similarity is greater than a threshold, and assigning a new person ID and incrementing a person counter by 1 when the similarity is not greater than the threshold.

18 Claims, 7 Drawing Sheets

(52) U.S. Cl.
CPC ......... *G06K 9/6215* (2013.01); *G06K 9/6255* (2013.01); *G06T 2207/10016* (2013.01); *G06T 2207/30196* (2013.01); *G06T 2207/30242* (2013.01)

(58) Field of Classification Search
CPC ............. G06K 9/6255; G06K 9/00771; G06K 9/00362; G06K 9/00791
See application file for complete search history.

PERSON COUNTING METHOD AND PERSON COUNTING SYSTEM

CROSS-REFERENCE TO RELATED APPLICATIONS

The present application claims priority under 35 U.S.C. § 119 to Chinese Application No. 201811243215 filed on Oct. 24, 2018, the entire contents of which are incorporated herein by reference.

BACKGROUND OF THE INVENTION

1. Field of the Invention

The present invention relates to the field of technologies of video surveillance and image processing, and specifically, a person counting method and a person counting system.

2. Description of the Related Art

In the field of video surveillance, it is often necessary to count the number of persons in a monitoring area. A more accurate counting result of the number of persons can provide valuable guidance information for industries such as resource management, public transportation, and advertising.

Conventional methods for counting persons mainly include person counting methods based on pedestrian detection, person counting methods based on clustering, and person counting methods based on regression. In the person counting methods based on pedestrian detection, the number of persons is counted by detecting each person independently. In the person counting methods based on clustering, the number of persons is estimated based on the number of corner points. In the person counting method based on regression, the number of persons is estimated based on image features.

An application scenario of the person counting is as follows. Panoramic video data of a monitoring area is captured using a panoramic camera, and persons appearing in the video frames of the panoramic video data are identified and counted. In this process, it is necessary to identify the same person in different video frames to avoid redundant counting of the same person. However, in the above counting process, it is difficult to improve recognition accuracy and to suppress redundant counting of the same person.

SUMMARY OF THE INVENTION

According to an aspect of the present invention, a person counting method is provided. The person counting method includes extracting, from a first video frame of a video source, a group of images of persons to obtain a first image set, each image corresponding to one person; dividing the first image set into a first subset and a second subset based on whether a related image corresponding to an image in the first image set exists in a second image set, and reusing a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame; estimating posture patterns of images in the first subset, and storing the images in the first subset into an image library based on person IDs and the posture patterns; and for each image in the second subset, selecting, from the image library, a target image whose similarity to the image in the second subset is highest, reusing a person ID of the target image for the corresponding image in the second subset when the similarity of the target image is greater than a predetermined threshold, and assigning a new person ID to the corresponding image in the second subset and outputting a value of a counter for counting persons after incrementing the counter by 1 when the similarity of the target image is less than or equal to the predetermined threshold.

According to another aspect of the present invention, a person counting system is provided. The person counting system includes an image extracting unit configured to extract, from a first video frame of a video source, a group of images of persons to obtain a first image set, each image corresponding to one person; a set dividing unit configured to divide the first image set into a first subset and a second subset based on whether a related image corresponding to an image in the first image set exists in a second image set, and reuse a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame; a posture estimating unit configured to estimate posture patterns of images in the first subset, and store the images in the first subset into an image library based on person IDs and the posture patterns; and a person counting unit configured to select, for each image in the second subset, from the image library, a target image whose similarity to the image in the second subset is highest, reuse a person ID of the target image for the corresponding image in the second subset when the similarity of the target image is greater than a predetermined threshold, and assign a new person ID to the corresponding image in the second subset and outputting a value of a counter for counting persons after incrementing the counter by 1 when the similarity of the target image is less than or equal to the predetermined threshold.

According to another aspect of the present invention, a person counting system is provided. The person counting system includes a memory storing computer-readable instructions; and one or more processors configured to execute the computer-readable instructions such that the one or more processors are configured to extract, from a first video frame of a video source, a group of images of persons to obtain a first image set, each image corresponding to one person; divide the first image set into a first subset and a second subset based on whether a related image corresponding to an image in the first image set exists in a second image set, and reuse a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame; estimate posture patterns of images in the first subset, and store the images in the first subset into an image library based on person IDs and the posture patterns; and for each image in the second subset, select, from the image library, a target image whose similarity to the image in the second subset is highest, reuse a person ID of the target image for the corresponding image in the second subset when the similarity of the target image is greater than a predetermined threshold, and assign a new person ID to the corresponding image in the second subset and outputting a value of a counter for counting persons after incrementing the counter by 1 when the similarity of the target image is less than or equal to the predetermined threshold.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, description of conventional functions and structure is omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed sequentially, however the order in which the steps are performed is not limited to the recited order. Any step may be performed in parallel with or independently of any other step.

The present disclosure has an object to provide a person counting method and a person counting system that can suppress redundant counting of the same person and can improve the accuracy of the result of person counting.

Figure 1:
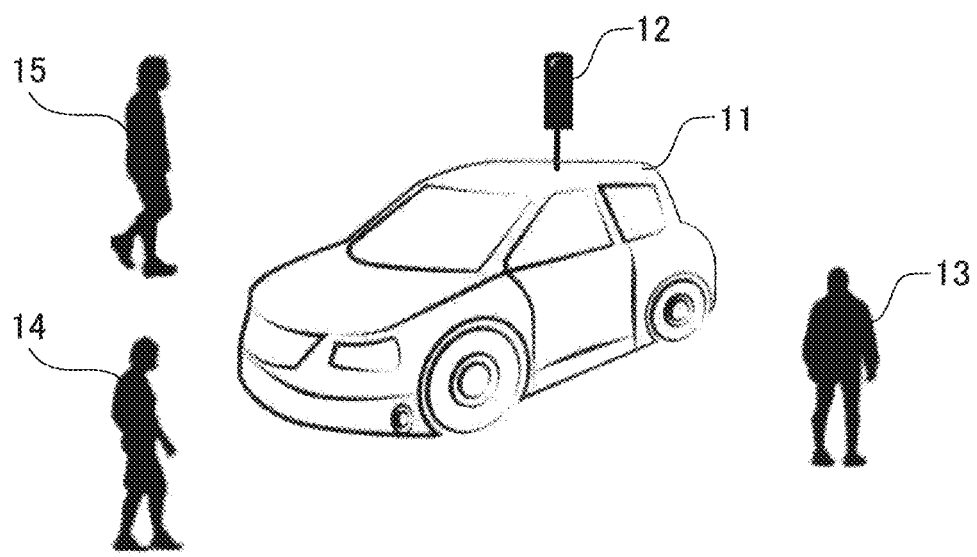
FIG. 1 is a schematic view illustrating an application scenario of a person counting method according to an embodiment of the present invention.

FIG. 1 is a schematic view illustrating an application scenario of a person counting method according to an embodiment of the present invention. In FIG. 1, a vehicle 11 is depicted, and a monitoring camera 12 is provided on top of the vehicle 11 for real-time monitoring of the environment around the vehicle 11 and to capture images of the crowds around the vehicle 11. The monitoring camera 12 may specifically be a panoramic camera or a conventional pinhole camera. A plurality of persons 13 to 15 are shown in FIG. 1, who are located around the vehicle 11, may walk toward the vehicle 11, move away from the vehicle 11, or move around the vehicle body. By the person counting method according to the embodiment of the present invention, the persons around the vehicle 11 in the above scenario can be counted, and thus the number of the persons interested in the vehicle 11 may be obtained.

Any conventional pedestrian detection method may be used to count the number of persons in similar scenarios, however it is easy to redundantly count the same person in the counting process using conventional pedestrian detection method. As an example, if there is a large difference in the walking posture of the person 13 between different video frames, for example, the person 13 moves toward the vehicle in the n-th frame, and the person 13 moves away from the vehicle in the m-th frame, accordingly there is a large difference between images of the person 13 in these two frame; it is easy to recognize person 13 in these two frames as two different persons and count them separately.

Figure 2:
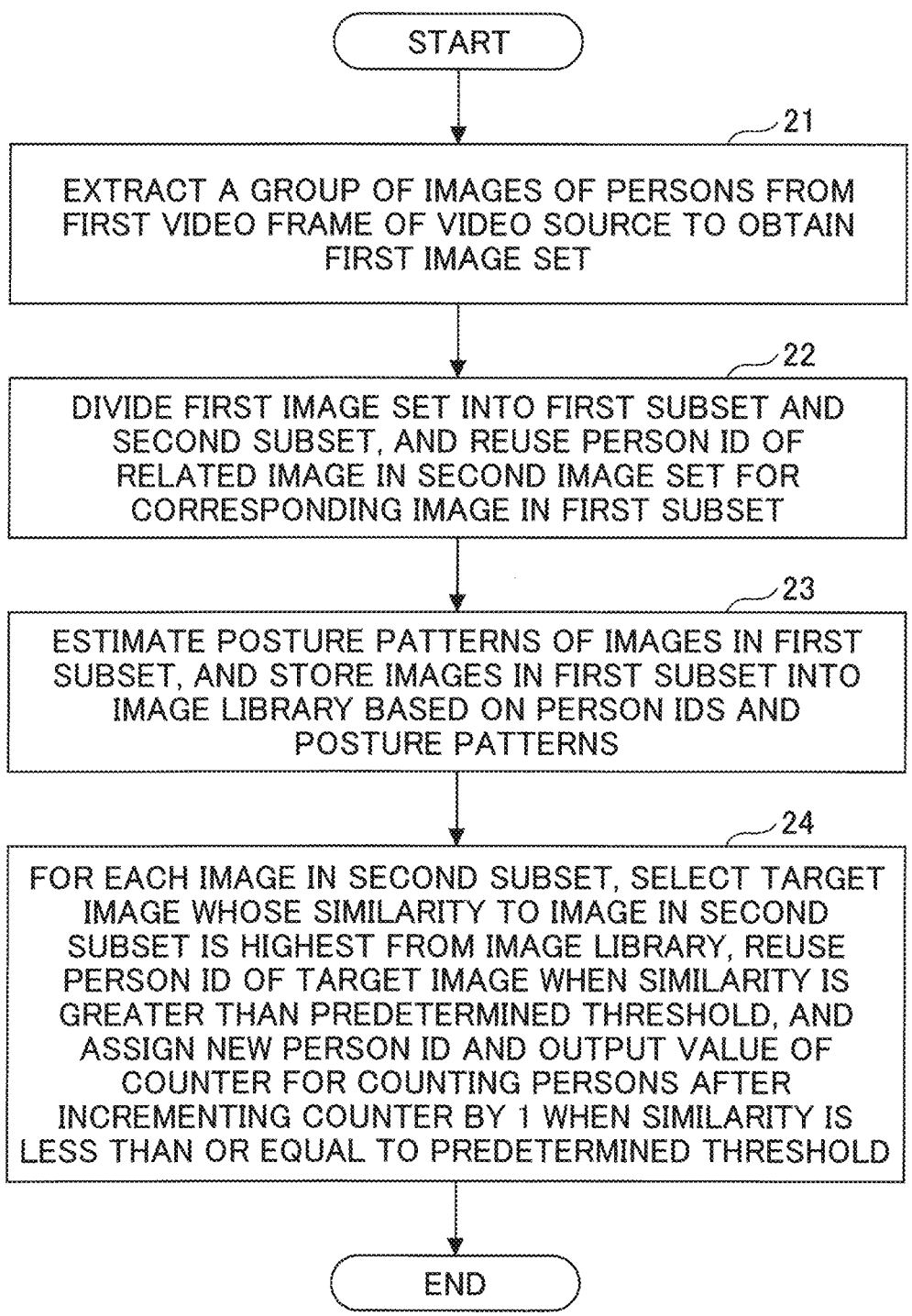
FIG. 2 is a flowchart illustrating a person counting method according to an embodiment of the present invention.

In order to suppress redundant counting of the same person and improve the accuracy of the result of person counting, an embodiment of the present invention provides a person counting method. As shown in FIG. 2, the person counting method includes steps 21 to 24.

Step 21: extract a group of images of persons from a first video frame of a video source to obtain a first image set. Here, each image corresponds to one person.

Here, the video source may be video data whose capturing process is completed, or video data captured in real-time. Specifically, the video source may be captured using a monitoring camera, such as a panoramic camera or a pinhole camera. For example, when captured by a panoramic camera, the video frames of the video source are panoramic video frames. Here, the first video frame may be any video frame after the earliest video frame in the video source.

In the embodiment of the present invention, an algorithm of pedestrian detection may be used to detect images of persons from a video frame, and each of the images corresponds to one person, so that a set of person images may be obtained. For example, when performing pedestrian detection on the first video frame of the video source, a first image set may be obtained, the first image set includes at least one person image detected from the first video frame. When detecting the person image, position information of the person image in the first video frame and timestamp information of the first video frame may also be extracted. The position information may be represented by coordinates (such as a longitude coordinate and a latitude coordinate) of the person image in the first video frame.

Step 22: divide the first image set into a first subset and a second subset based on whether a related image corresponding to an image in the first image set exists in a second image set; and reuse a person ID of the related image in the second image set for the corresponding image in the first subset. Here, the second image set is a group of images of persons extracted from a preceding video frame that precedes the first video frame. A prediction position where the related image in the second image set is located in the first video frame matches an actual position where the corresponding image in the first image set is located in the first video frame.

Here, the preceding video frame (hereinafter also referred to as the "second video frame") is a video frame immediately before the first video frame in the video source (namely, the second video frame is adjacent to the first video frame). Because the behavioral actions of a person usually continues for a certain period of time, the person images detected from the first video frame may be associated with the person images detected from the second video frame so as to recognize a person who has appeared in the second video frame, and a previously assigned person ID may be reused for the person who has appeared in the second video frame. Here, the previously assigned person ID may be assigned when the person is detected in the second video frame, or may be assigned in a video frame before the second video frame. Thus, it is possible to ensure that the same person has the same person ID in different video frames.

The following process may be used in determining whether a related image exists. The position of each person image in the second video frame may be tracked by a position tracking algorithm, and the position where each person image in the second video frame is located in the first video frame may be predicted, thereby obtain at least one prediction position. Then, for each person image detected from the first video frame, it is determined using a position matching algorithm whether the actual position of the person image matches any prediction position. If a prediction position that matches the actual position exists, it is determined that a related image exists. If the actual position of the person image does not match all of the prediction positions, it is determined that no related image exists. By the above determination process, for each image in the first image set, if a related image corresponding to the image exists in the second image set, the image is classified into the first subset, otherwise the image is classified into the second subset, thereby dividing the first image set into the first subset and the second subset.

Step 23: estimate posture patterns of images in the first subset, and store the images in the first subset into an image library based on person IDs and the posture patterns.

Here, for each image in the first subset (hereinafter referred to as each "image to be estimated" for convenience of description), a moving direction of the image to be estimated is predicted, based on a position change of an image having the same person ID as the image to be estimated in continuous video frames. Specifically, the prediction may be performed using a correlation motion estimation algorithm. Then, an included angle between the moving direction and an equator of the first video frame is calculated; and a posture pattern corresponding to the included angle is determined as the posture pattern of the image to be estimated, based on a predetermined correspondence between angles and posture patterns.

Here, the image library is used to store records of the images of the video source whose person ID has been assigned. When storing the images in the first subset into the image library, each image in the first subset, the person ID and the posture pattern of the image, position information of the image in a video frame to which the image belongs, and timestamp information of the video frame to which the image belongs (namely, the timestamp information of the first video frame in the video source) may be stored into a record having the same person ID and the same posture pattern as the image in the image library. In this way, for the person corresponding to each person ID, the images of the person in different posture patterns, the position information of the images, and the timestamp information can be maintained in the image library. Furthermore, in order to reduce the amount of the storage space required, a predetermined number threshold may be set for each gesture pattern, namely, if the number of images of a certain person in a certain posture pattern exceeds the predetermined number threshold, one or more images whose timestamp information is earlier may be deleted, thereby ensuring that the number of images does not exceed the predetermined number.

Step 24: for each image in the second subset, select a target image whose similarity to the image in the second subset is highest from the image library, and reuse a person ID of the target image for the corresponding image in the second subset when the similarity of the target image is greater than a predetermined threshold, otherwise assign a new person ID to the corresponding image in the second subset and output a value of a counter for counting persons after incrementing the counter by 1.

Here, each image in the second subset (hereinafter referred to as each "image to be recognized" for convenience of description) and each image in the image library may be recognized by a deep learning algorithm, so as to obtain top N candidate images in a descending order of scores. N is an integer greater than 1. Then, position similarities may be calculated based on position information of the image to be recognized and the candidate images, and time similarities may be calculated based on timestamp information of the image to be recognized and the candidate images. Then, similarity scores of the candidate images may be obtained by calculating weighted sums of the respective position similarities and the respective time similarities, and the candidate image with the highest similarity score may be determined as the target image.

After obtaining the target image whose similarity to the image to be recognized is highest, it is determined whether the similarity score is greater than a predetermined threshold. If YES, it is determined that both the image to be recognized and the candidate image correspond to the same person, and a person ID of the target image may be reused for the image to be recognized; otherwise, it is determined that the image to be recognized and the candidate image are different persons, a new person ID is assigned to the image to be recognized, and the value of a counter for counting persons is incremented by 1 to update the number of persons detected in the video source.

In the above steps, a dynamic image library is constructed by using the posture pattern, the position information and the time information, and persons who have appeared in video frames are recognized by using the information of the above three dimensions, thereby improving the accuracy of the person recognition by increasing the intra-class similarity.

By the above steps, the embodiment of the present invention can store images of the same person in different posture patterns in the image library, and can recognize the same person in different posture patterns using the image library. Thus, it is possible to suppress redundant counting of the same person and improve the accuracy of person counting.

In the embodiment of the present invention, in order to suppress data alignment problems caused by nonlinear distortion of a camera and to improve the accuracy of the person recognition in a case where the video frames of the video source are panoramic video frames, in step s22, after dividing the first image set into the first subset and the second subset, panoramic image transform processing may be performed on the images in the first subset and the second subset, perspective mapping images of the images may be obtained, and the images in the first subset and the second subset may be updated, namely, the images in the first subset and the second subset may be replaced by corresponding perspective mapping images. Specifically, perspective mapping images corresponding to the images in the first subset and the second subset may be obtained by a perspective projection transformation algorithm.

The steps shown in FIG. 2 may be performed for any video frame after the earliest video frame in the video source. When the first video frame in the video source is processed, it is necessary to initialize the image library and the counter for counting persons. The record in the initialized image library is empty, and the value of the initialized counter for counting persons is 0. For example, a group of person images are extracted from the earliest video frame to obtain a third image set, and each image corresponds to one person. Because no video frame exists before the earliest video frame, it is not necessary to perform the dividing process of step 22. In this case, posture patterns of images in the third image set are directly estimated, a new person ID is assigned for each image in the third image set, and the value of the counter for counting persons is incremented by 1. Then, the images of the third image set are stored into the image library based on the person ID and gesture pattern. After the processing of the earliest video frame is completed, the processing of the subsequent video frames may be performed by referring to the process shown in FIG. 2.

Compared with the conventional technologies, the person counting method and the person counting system according to the embodiment of the present invention can store images of the same person in different posture patterns in the image library, and can recognize the same person in different posture patterns using the image library. Thus, it is possible to minimize redundant counting of the same person and thereby improve the accuracy of person counting. Furthermore, in the embodiment of the present invention, data alignment problems caused by nonlinear distortion of a camera by performing panoramic image transform processing on the images can be suppressed, thereby improving the accuracy of subsequent person recognition and further improving the accuracy of person counting. Furthermore, the embodiment of the present invention constructs a dynamic image library by using the posture pattern, the position information and the time information, and recognizes persons who have appeared in video frames by using the information of the above three dimensions, thereby improving the accuracy of the recognition by increasing the intra-class similarity.

Figure 3:
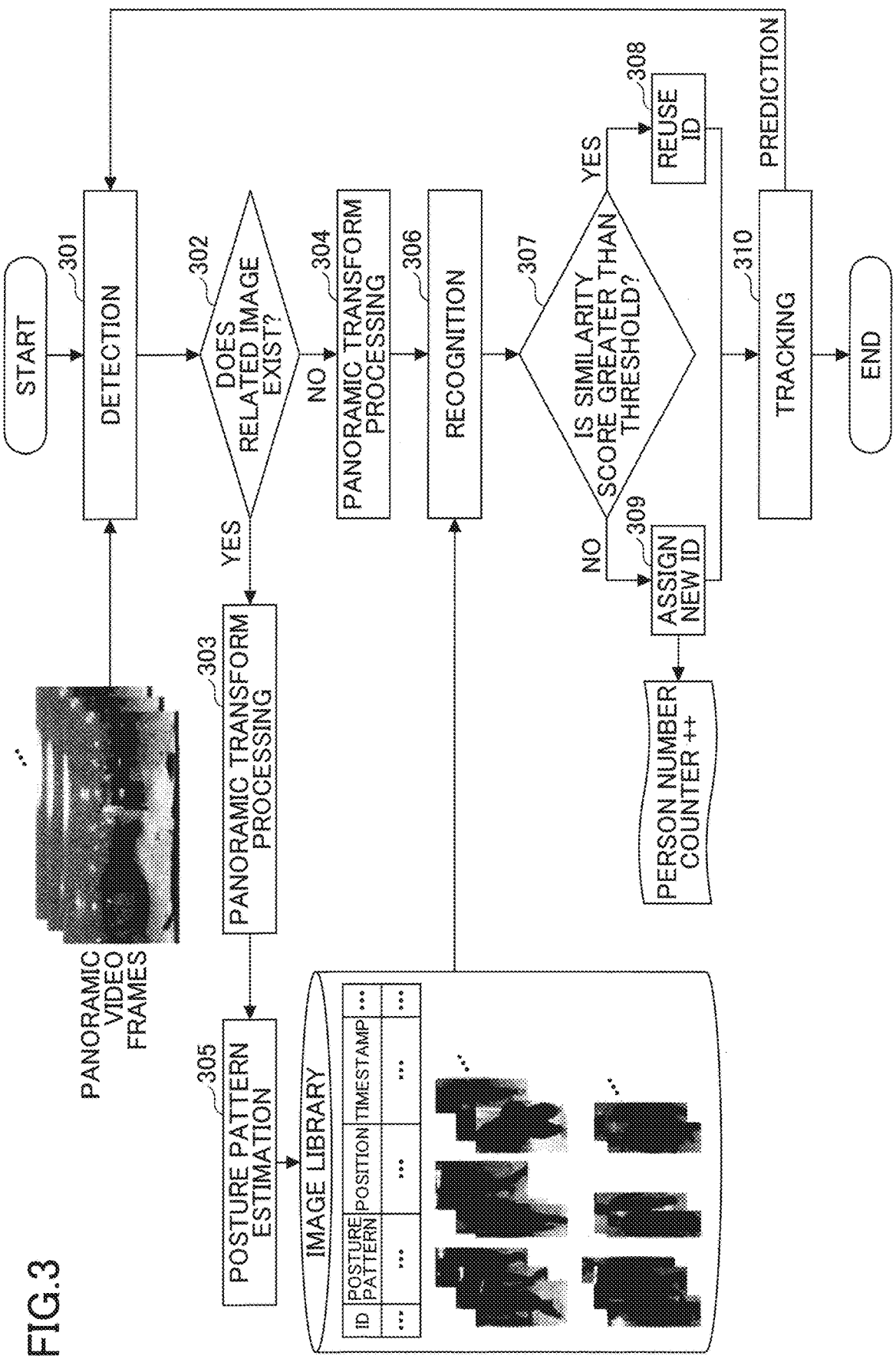
FIG. 3 is another flowchart illustrating a person counting method according to an embodiment of the present invention.

A method according to an embodiment of the present invention will be described below through a more specific process. In the process, the processing of an (n+1)-th panoramic video frame of a panoramic video source is taken as an example for description. As shown in FIG. 3, a person counting method according to the embodiment of the present invention includes steps 301 to 310.

Step 301: receive the (n+1)-th panoramic video frame of the panoramic video source, extracting a group of person images from the panoramic video frame to obtain an image set. Each person image corresponds to one person. Here, n is an integer greater than 0.

For convenience of description, the image set extracted from the (n+1)-th panoramic video frame is referred to as the "first image set", and the person images in the first image set are referred to as the "first image". Here, detection may be performed on the panoramic video frame by using an algorithm of person detection based on a Convolutional Neural Network (CNN). By the detection, it is possible to obtain each person image, and position information of the image in the panoramic video frame, which includes a longitude coordinate and a latitude coordinate. For example, the range of the latitude coordinate may be ($-90°$ to) $90°$, and the range of the longitude coordinate may be ($-180°$ to $180°$). Here, the timestamp information of the panoramic video frame in the video source may also be recorded. For example, if the timestamp information in the video source is 00:02:36:23, it indicates that the panoramic video frame is located at 00 hours 02 minutes 36.23 seconds of the video source.

Step 302: obtain a prediction position of a person image of an n-th panoramic video frame in the (n+1)-th panoramic video frame, and classify the first image into a first subset or a second subset based on whether a related image corresponding to the first image exists in the n-th panoramic video frame.

Similarly, an image set extracted from the n-th panoramic video frame is referred to as a "second image set", and the person images in the second image set are referred to as the "second image". The new position of the second image in the (n+1)-th panoramic video frame may be predicted by tracking the second image, and the state of the second image may be updated based on the predicted new position. Specifically, the position tracking may be performed using an algorithm such as Kalman filtering or the like. After obtain the prediction position, position matching is performed on the actual position of the first image in the (n+1)-th panoramic video frame and the prediction position of the second image in the n-th panoramic video frame, and it is determined whether a related image corresponding to the first image exists. Specifically, the position matching may be performed using an algorithm such as a Hungarian algorithm or the like. If the first image and the updated second image are successfully associated (namely, the positions match), the person ID of the related image may reused for the first image, and the first image may be added to the first subset. If no related image matching the first image exists, the first image may be added to the second subset.

Step 303: perform panoramic transform processing on the images in the first subset, and convert the images into perspective mapping images, thereby updating the images in the first subset.

Step 304: perform panoramic transform processing on the images in the second subset, and convert the images into perspective mapping images, thereby updating the images in the second subset.

In above step 303 and step 304, when the panoramic transform processing is performed on the images in the first subset and/or the second subset, the image may be converted into the perspective mapping images by a perspective projection transformation algorithm. Thus, it is possible to facilitate image alignment when image recognition processing is performed using the updated images in the first subset and/or the second subset in subsequent step 306, thereby improving the accuracy of the recognition.

Step 305: estimate posture patterns of updated images in the first subset, and store related data of the images in the first subset into an image library. The related data may include the following metadata: updated images in the first subset, the person IDs of the images, the posture patterns of the images, the position information of the images in the (n+1)-th panoramic video frame (such as longitude coordinates and latitude coordinates), and the timestamp information.

Here, when estimating the posture patterns, first, a moving direction of a person may be predicted by using a position change of a corresponding image having the same person ID in continuous video frames. For example, a moving direction of a person may be predicted, based on a position change of an image having the ID of the person in k continuous video frames including the (n+1)-th frame. Then, an included angle between the moving direction and an equator of the panoramic video frame is calculated, and the posture of the person is classified based on the included angle. For example, angle ranges corresponding to respective posture patterns may be set in advance. Then, after calculating the above included angle, an angle range to which the angle belongs may be determined, and the posture patterns corresponding to the angle range may be determined, thereby obtaining the posture pattern of the person.

Figure 4:
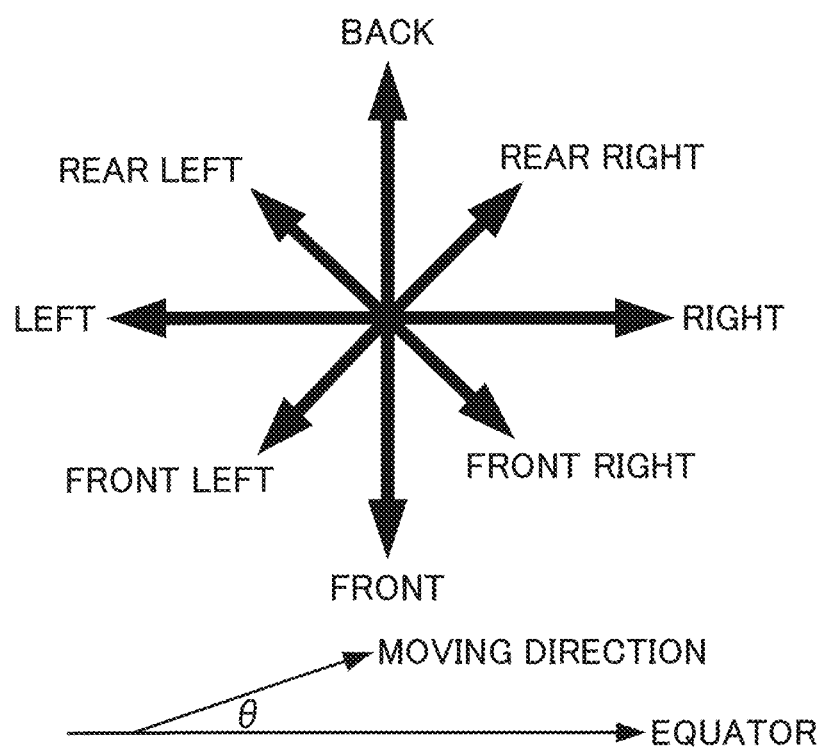
FIG. 4 is a schematic view illustrating an example of estimation of a posture pattern according to an embodiment of the present invention.

As shown in FIG. 4, possible posture patterns may include 8 types of posture patterns: front, back, left, right, front left, front right, rear left, and rear right, and the included angle between the adjacent posture patterns is 45 degrees. Angle ranges corresponding to respective posture patterns may be set in advance. For example, the angle range corresponding to "front" may be set to [247.5°, 292.5°), the angle range corresponding to "back" may be set to [67.5°, 112.5°), the angle range corresponding to "rear right" may be set to [22.5°, 67.5°), and it may be determined that the posture pattern is "rear right" when the calculated included angle between the moving direction and the equator is 30°.

Here, in the image library, data is stored in accordance with the person ID and the posture pattern of the image, and related data of a number, which is not more than a predetermined number, of images with the same person ID are stored in each posture pattern. When storing the first image in the image library, if the predetermined number of the images with the same person ID and posture pattern as the first image have been stored, the image with the earliest timestamp information may be deleted from the stored images before storing the first image.

Step 306: recognize each updated image in the second subset and each image in the image library to obtain a target image whose similarity is highest.

Figure 5:
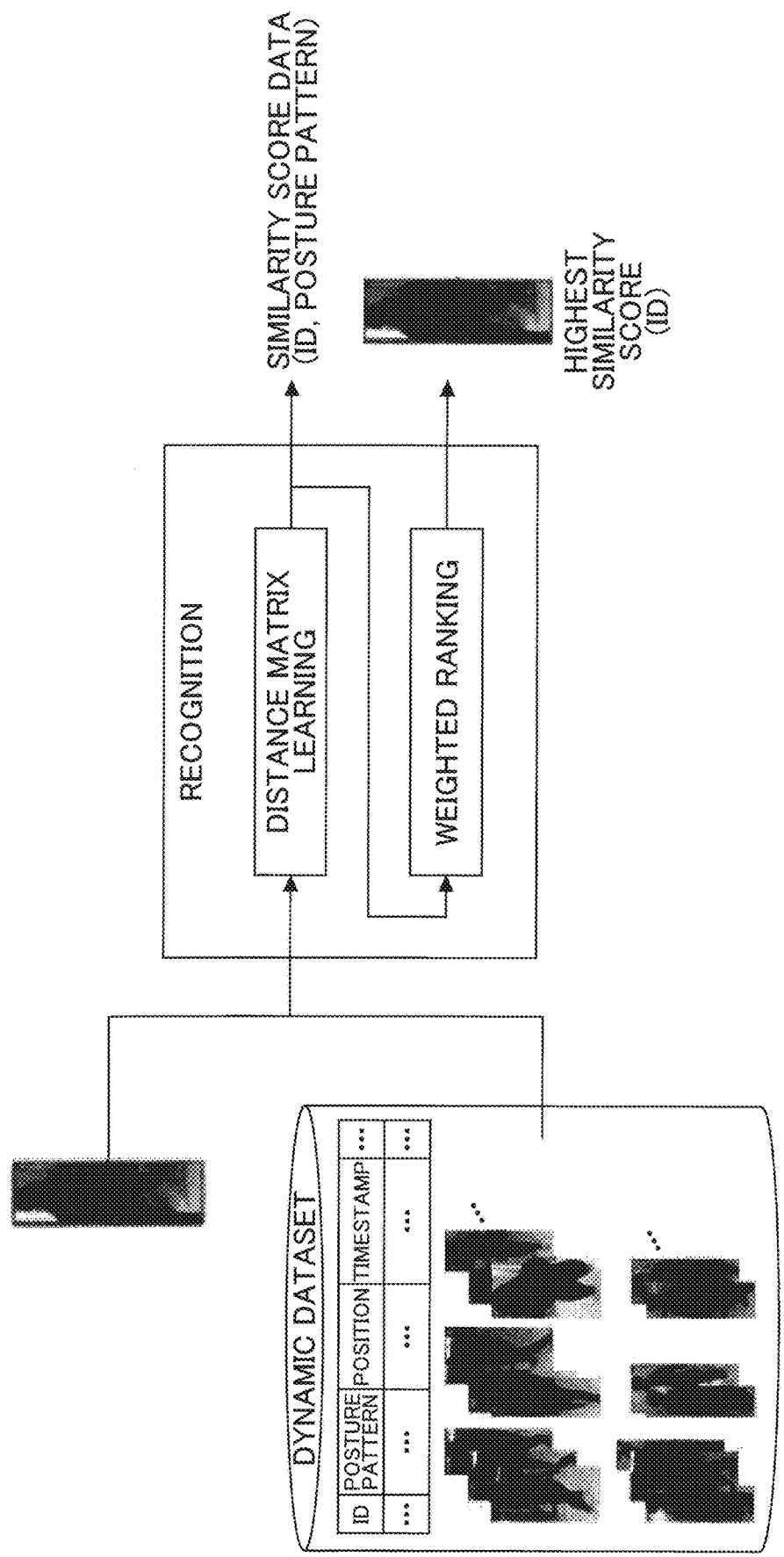
FIG. 5 is a schematic view illustrating an example of determining a target image according to an embodiment of the present invention.

Here, each updated image in the second subset is respectively recognized with each image in the image library to obtain an image with the highest score. Specifically, as shown in FIG. 5, the image in the second subset and each image in the image library may be recognized by deep learning (for example, by distance matrix learning), and top k candidate images in a descending order of scores are obtained. Here, k is an integer greater than 2. Then, the target image is obtained, by further selecting the image with the highest score using time similarities and position similarities.

Specifically, for each candidate image, a similarity score Similarity of the candidate image may be calculated according to the following formula. Here, the time similarity may be represented by a difference in timestamp between the image in the second subset and the candidate image, and the position similarity may be a Euclidean distance between the two images.

$$Similarity = \alpha S_{time} + \beta S_{position}$$

$$S_{time} = Time\_diff\ (t1, t2)$$

$$S_{position} = Euler\_distance\ (lng1, lat1, lng2, lat2)$$

In the above formula, $S_{time}$ represents the time similarity; $S_{position}$ represents the position similarity; $\alpha$ and $\beta$ respectively represent predetermined weights corresponding to the time position and the position similarity; t1 represents the timestamp information of the image in the second subset; t2 represents the timestamp information of the candidate image; lng1 and lat1 respectively represent the longitude coordinate and the latitude coordinate of the position point of the image in the second subset; lng2 and lat2 respectively represent the longitude coordinate and the latitude coordinate of the position point of the candidate image; Time_diff (t1, t2) represents the calculated difference between t1 and t2; and Euler_distance (lng1, lat1, lng2, lat2) represents the calculated Euclidean distance between the two position points.

Steps 307 to 309: determine whether the similarity score of the target image is greater than a predetermined threshold. If YES, it means that a person corresponding to the image in the second subset exists in a preceding video frame, and the person ID of the target image may be reused for the image in the second subset. If NO, a new person ID is assigned to the image in the second subset, and a value of a counter for counting persons is incremented by 1. In this way, the processing of the (n+1)-th panoramic video frame is completed. At this time, the current value of the counter for counting persons is the detected number of persons up to the (n+1)-th panoramic video frame.

Step 310: perform tracking on a person image in the (n+1)-th panoramic video frame, obtain the predicted position of the person image of the (n+1)-th panoramic video frame in an (n+2)-th panoramic video frame, and then return step 301 to continue processing on the (n+2)-th panoramic video frame of the video source.

By the above steps according to the embodiment of the present invention, it is possible to perform continuous and real-time person counting on the video frames of the video source, and to perform processing for avoiding redundant counting of the same person, thereby obtaining a relatively accurate result of person counting.

An embodiment of the present invention further provides a non-transitory computer-readable recording medium where a computer program is stored. When the computer program is executed by one or more processors, the computer program causes the one or more processors to carry out the steps of the person counting method according to any one embodiment of the present invention.

Figure 6:
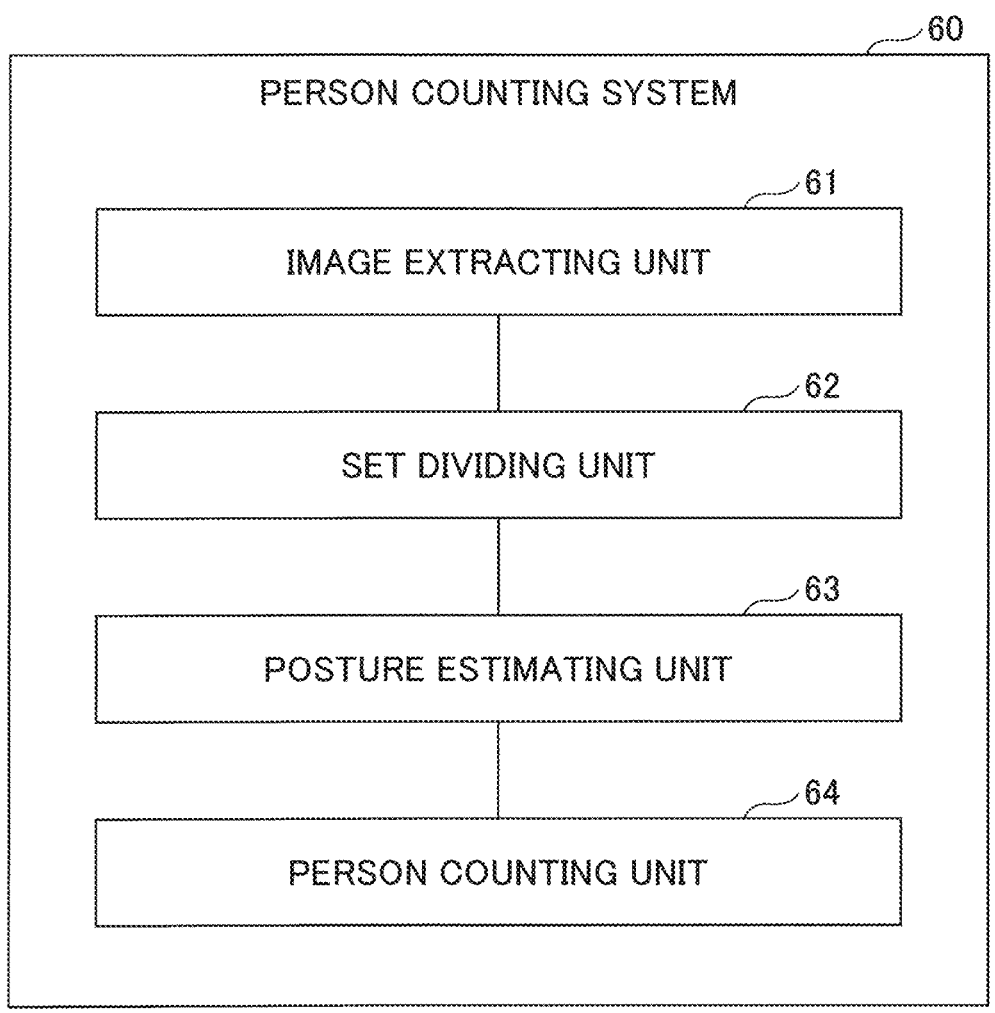
FIG. 6 is a block diagram illustrating a configuration of a person counting system according to an embodiment of the present invention.

An embodiment of the present invention further provides a person counting system 60. As shown in FIG. 6, the person counting system 60 includes an image extracting unit 61, a set dividing unit 62, a posture estimating unit 63, and a person counting unit 64.

The image extracting unit 61 extracts, from a first video frame of a video source, a group of images of persons to obtain a first image set. Each image corresponds to one person.

The set dividing unit 62 divides the first image set into a first subset and a second subset based on whether a related image corresponding to an image in the first image set exists in a second image set; and reuse a person ID of the related image in the second image set for the corresponding image in the first subset. The second image set is a group of images of persons extracted from a preceding video frame that precedes the first video frame, and a prediction position where the related image in the second image set is located in the first video frame matches an actual position where the corresponding image in the first image set is located in the first video frame.

The posture estimating unit 63 estimates posture patterns of images in the first subset; and stores the images in the first subset into an image library based on person IDs and the posture patterns.

The person counting unit 64 selects, for each image of the second subset, from the image library, a target image whose similarity to the image in the second subset is highest; reuses a person ID of the target image for the corresponding image in the second subset when the similarity of the target image is greater than a predetermined threshold; and assigns a new person ID to the corresponding image in the second subset and outputting a value of a counter for counting persons after incrementing the counter by 1 when the similarity of the target image is less than or equal to the predetermined threshold.

Preferably, in order to suppress data alignment problem caused by nonlinear distortion of a camera and improve the accuracy of the person recognition in a case where the video frames of the video source are panoramic video frames, the set dividing unit 62 may further include an image transform unit. The image transform unit performs panoramic image transform processing on the images in the first subset and the second subset to update the images in the first subset and the second subset.

Preferably, the image transform unit updates, by a perspective projection transformation algorithm, the images in the first subset and the second subset.

Preferably, the posture estimating unit 63 predicts, for each image to be estimated in the first subset, based on a position change of an image having the same person ID as the image to be estimated in continuous video frames, a moving direction of the image to be estimated; calculates an included angle between the moving direction and an equator of the first video frame; and determines, based on a predetermined correspondence between angles and posture patterns, a posture pattern corresponding to the included angle as the posture pattern of the image to be estimated.

Preferably, the posture estimating unit 63 stores each image in the first subset, the person ID and the posture pattern of the image, position information of the image in a video frame to which the image belongs, and timestamp information of the video frame to which the image belongs into a record having the same person ID and the same posture pattern as the image in the image library.

Preferably, the person counting unit 64 recognizes, by a deep learning algorithm, each image to be recognized in the second subset and each image in the image library to obtain top N candidate images in a descending order of scores, N being an integer greater than 1; and calculates, based on position information of the image to be recognized and the candidate images, position similarities; calculates, based on timestamp information of the image to be recognized and the candidate images, time similarities; and obtains similarity scores of the candidate images by calculating weighted sums of the respective position similarities and the respective time similarities, and determines the candidate image with the highest similarity score as the target image.

Figure 7:
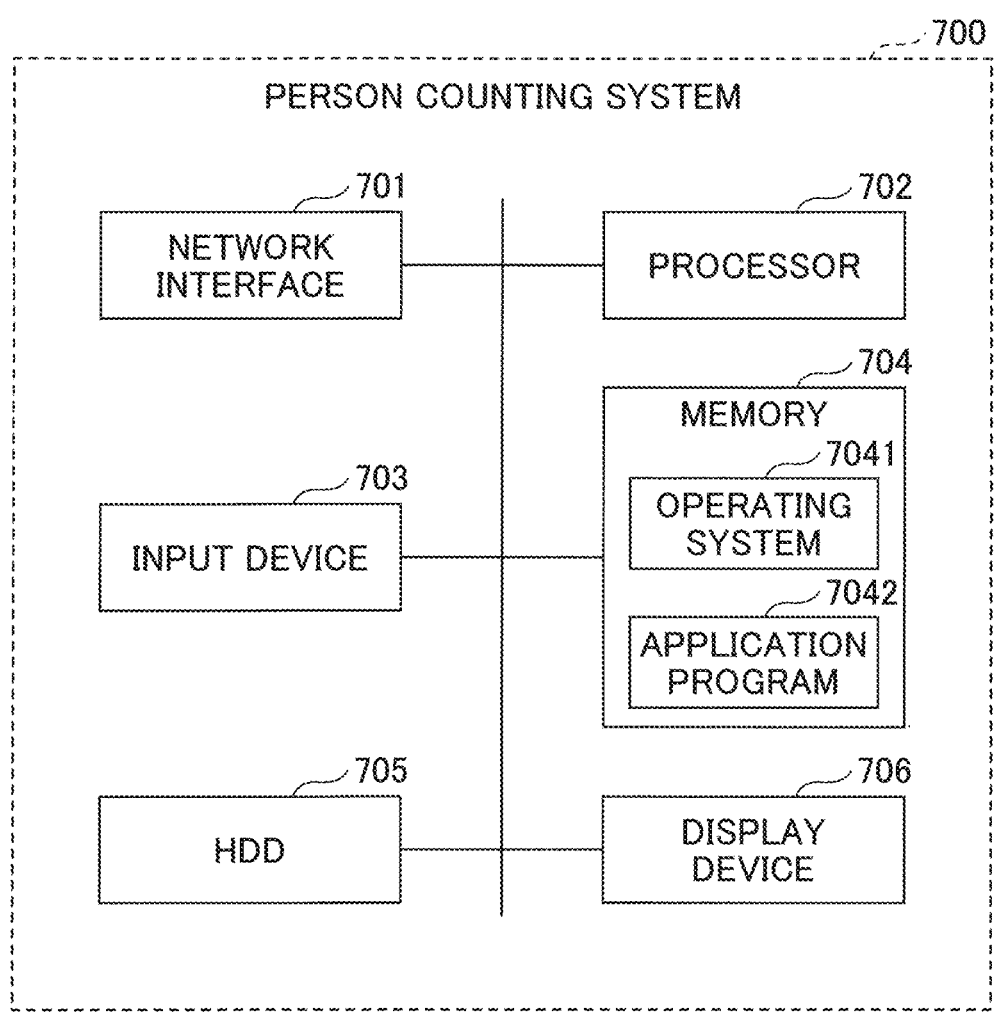
FIG. 7 is a block diagram illustrating a hardware structure of a person counting system according to an embodiment of the present invention.

FIG. 7 is a block diagram illustrating a hardware structure of a person counting system 700 according to an embodiment of the present invention. As shown in FIG. 7, the person counting system 700 includes a processor 702, and a memory 704 storing computer-readable instructions.

When the computer-readable instructions are executed by the processor 702, the processor 702 extracts, from a first video frame of a video source, a group of images of persons to obtain a first image set, each image corresponding to one person; divides, based on whether a related image corresponding to an image in the first image set exists in a second image set, the first image set into a first subset and a second subset, and reuses a person ID of the related image in the second image set for the corresponding image in the first subset, the second image set being a group of images of persons extracted from a preceding video frame that precedes the first video frame, a prediction position where the related image in the second image set is located in the first video frame matching an actual position where the corresponding image in the first image set is located in the first video frame; estimates posture patterns of images in the first subset, and stores the images in the first subset into an image library based on person IDs and the posture patterns; and for each image of the second subset, selects, from the image library, a target image whose similarity to the image in the second subset is highest, reuses a person ID of the target image for the corresponding image in the second subset when the similarity of the target image is greater than a predetermined threshold, and assigns a new person ID to the corresponding image in the second subset and outputting a value of a counter for counting persons after incrementing the counter by 1 when the similarity of the target image is less than or equal to the predetermined threshold.

As illustrated in FIG. 7, the person counting system 700 further includes a network interface 701, an input device 703, a hard disk drive (HDD) 705, and a display device 706.

Each of ports and each of devices may be connected to each other via a bus architecture. The processor 702 such as one or more central processing units (CPUs), and the memory 704 such as one or more memory units may be connected via various circuits. Other circuits such as an external device, a regulator and a power management circuit may also be connected via the bus architecture. Note that these devices are communicably connected via the bus architecture. The bus architecture includes a power supply bus, a control bus and a status signal bus besides a data bus. A detailed description of the bus architecture is omitted here.

The network interface 701 may be connected to a network (such as the Internet, a LAN or the like), receive information from the network, and store the received information in the hard disk drive 705.

The input device 703 may receive various commands such as predetermined threshold and its setting information input by a user, and transmit the commands to the processor 702 to be executed. The input device 703 may include a keyboard, a click apparatus (such as a mouse or a track ball), a touch board, a touch panel or the like.

The display device 706 may display a result obtained by executing the commands, and for example, may display a result of person counting up to a currently processed video frame in real-time.

The memory 704 stores programs and data required for running an operating system, and data such as intermediate results in calculation processes of the processor 702.

Note that the memory 704 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which used as an external high-speed buffer. The memory 704 of the apparatus or the method described herein includes and is not limited to any other suitable memory.

In some embodiments, the memory 704 stores executable modules or data structure, their subsets, or their superset, i.e., an operating system (OS) 7041 and an application program 7042.

The operating system 7041 includes various system programs for implementing various essential tasks and processing tasks based on hardware, such as a frame layer, a core library layer, a drive layer and the like. The application program 7042 includes various application programs for realizing various application tasks, such as a browser and the like. A program for realizing the method according to the embodiments of the present invention may be included in the application program 7042.

The method according to the above embodiments of the present invention may be applied to the processor 702 or may be realized by the processor 702. The processor 702 may be an integrated circuit chip capable of processing signals. Each step of the above method may be realized by instructions in a form of integrated logic circuit of hardware in the processor 42 or a form of software. The processor 702 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any common processors. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 44, and the processor 42 reads information in the memory 44 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, micro-controllers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Specifically, the video frames of the video source may be panoramic video frames, and when the computer-readable instructions are executed by the processor 702, the processor 702 may perform panoramic image transform processing on the images in the first subset and the second subset to update the images in the first subset and the second subset.

Specifically, when the computer-readable instructions are executed by the processor 702, the processor 702 may update, by a perspective projection transformation algorithm, the images in the first subset and the second subset.

Specifically, when the computer-readable instructions are executed by the processor 702, the processor 702 may for each image to be estimated in the first subset, predict, based on a position change of an image having the same person ID as the image to be estimated in continuous video frames, a moving direction of the image to be estimated; calculate an included angle between the moving direction and an equator of the first video frame; and determine, based on a predetermined correspondence between angles and posture patterns, a posture pattern corresponding to the included angle as the posture pattern of the image to be estimated.

Specifically, when the computer-readable instructions are executed by the processor 702, the processor 702 may store each image in the first subset, the person ID and the posture pattern of the image, position information of the image in a video frame to which the image belongs, and timestamp information of the video frame to which the image belongs into a record having the same person ID and the same posture pattern as the image in the image library.

Specifically, when the computer-readable instructions are executed by the processor 702, the processor 702 may recognize, by a deep learning algorithm, each image to be recognized in the second subset and each image in the image library to obtain top N candidate images in a descending order of scores, N being an integer greater than 1; calculate, based on position information of the image to be recognized and the candidate images, position similarities; calculate, based on timestamp information of the image to be recognized and the candidate images, time similarities; and obtain similarity scores of the candidate images by calculating weighted sums of the respective position similarities and the respective time similarities, and determine the candidate image with the highest similarity score as the target image.

As known by a person skilled in the art, the elements and algorithm steps of the embodiments disclosed herein may be implemented by electronic hardware or a combination of computer software and electronic hardware. Whether these functions are performed in hardware or software depends on the specific application and design constraints of the solution. A person skilled in the art may use different methods for implementing the described functions for each particular application, but such implementation should not be considered to be beyond the scope of the present invention.

As clearly understood by a person skilled in the art, for the convenience and brevity of the description, the specific working process of the system, the device and the unit described above may refer to the corresponding process in the above method embodiment, and detailed descriptions are omitted here.

In the embodiments of the present application, it should be understood that the disclosed apparatus and method may be implemented in other manners. For example, the device embodiments described above are merely illustrative. For example, the division of the unit is only a logical function division. In actual implementation, there may be another division manner, for example, units or components may be combined or be integrated into another system, or some features may be ignored or not executed. In addition, the coupling or direct coupling or communication connection described above may be an indirect coupling or communication connection through some interface, device or unit, and may be electrical, mechanical or the like.

The units described as separate components may be or may not be physically separated, and the components displayed as units may be or may not be physical units, that is to say, may be located in one place, or may be distributed to network units. Some or all of the units may be selected according to actual needs to achieve the objectives of the embodiments of the present invention.

In addition, each functional unit the embodiments of the present invention may be integrated into one processing unit, or each unit may exist physically separately, or two or more units may be integrated into one unit.

The functions may be stored in a computer readable storage medium if the functions are implemented in the form of a software functional unit and sold or used as an independent product. Based on such understanding, the technical solution of the present invention, which is essential or contributes to the prior art, or a part of the technical solution, may be embodied in the form of a software product, which is stored in a storage medium, including instructions that are used to cause a computer device (which may be a personal computer, a server, or a network device, etc.) to perform all or a part of the steps of the methods described in the embodiments of the present invention. The above storage medium includes various media that can store program codes, such as a USB flash drive, a mobile hard disk, a ROM, a RAM, a magnetic disk, or an optical disk.

The present invention is not limited to the specifically disclosed embodiments, and various modifications, combinations and replacements may be made without departing from the scope of the present invention.

What is claimed is:

1. A person counting method comprising:
   extracting, from a first video frame of a video source, a group of images of persons to obtain a first image set, each image corresponding to one person;
   dividing the first image set into a first subset and a second subset based on whether a related image corresponding to an image in the first image set exists in a second image set, and reusing a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame;
   estimating posture patterns of images in the first subset, and storing the images in the first subset into an image library based on person IDs and the posture patterns; and
   for each image in the second subset, selecting, from the image library, a target image whose similarity to the image in the second subset is highest, reusing a person ID of the target image for the corresponding image in the second subset when the similarity of the target image is greater than a predetermined threshold, and assigning a new person ID to the corresponding image in the second subset and outputting a value of a counter for counting persons after incrementing the counter by 1 when the similarity of the target image is less than or equal to the predetermined threshold.

2. The person counting method as claimed in claim 1, wherein the video frames of the video source are panoramic video frames, and
   wherein the person counting method further includes
   performing panoramic image transform processing on the images in the first subset and the second subset to update the images in the first subset and the second subset, before estimating the posture patterns of the images in the first subset.

3. The person counting method as claimed in claim 2, wherein performing the panoramic image transform processing on the images in the first subset and the second subset includes
   updating, by a perspective projection transformation algorithm, the images in the first subset and the second subset.

4. The person counting method as claimed in claim 1, wherein estimating the posture patterns of the images in the first subset includes
   for each image to be estimated in the first subset, predicting, based on a position change of an image having the same person ID as the image to be estimated in continuous video frames, a moving direction of the image to be estimated;
   calculating an included angle between the moving direction and an equator of the first video frame; and
   determining, based on a predetermined correspondence between angles and posture patterns, a posture pattern corresponding to the included angle as the posture pattern of the image to be estimated.

5. The person counting method as claimed in claim 1, wherein storing the images in the first subset into the image library includes
   storing each image in the first subset, the person ID and the posture pattern of the image, position information of the image in a video frame to which the image belongs, and timestamp information of the video frame to which the image belongs into a record having the same person ID and the same posture pattern as the image in the image library.

6. The person counting method as claimed in claim 5, wherein selecting the target image whose similarity to the image in the second subset is highest from the image library includes
   recognizing, by a deep learning algorithm, each image to be recognized in the second subset and each image in the image library to obtain top N candidate images in a descending order of scores, N being an integer greater than 1; and
   calculating, based on position information of the image to be recognized and the candidate images, position similarities;
   calculating, based on timestamp information of the image to be recognized and the candidate images, time similarities; and
   obtaining similarity scores of the candidate images by calculating weighted sums of the respective position similarities and the respective time similarities, and determining the candidate image with the highest similarity score as the target image.

7. A person counting system comprising:
   an image extracting unit configured to extract, from a first video frame of a video source, a group of images of persons to obtain a first image set, each image corresponding to one person;
   a set dividing unit configured to divide the first image set into a first subset and a second subset based on whether a related image corresponding to an image in the first image set exists in a second image set, and reuse a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame;
   a posture estimating unit configured to estimate posture patterns of images in the first subset, and store the images in the first subset into an image library based on person IDs and the posture patterns; and a person counting unit configured to select, for each image in the second subset, from the image library, a target image whose similarity to the image in the second subset is highest, reuse a person ID of the target image for the corresponding image in the second subset when the similarity of the target image is greater than a predetermined threshold, and assign a new person ID to the corresponding image in the second subset and outputting a value of a counter for counting persons after incrementing the counter by 1 when the similarity of the target image is less than or equal to the predetermined threshold.

8. The person counting system as claimed in claim 7, wherein the video frames of the video source are panoramic video frames, and
wherein the set dividing unit further includes
an image transform unit configured to perform panoramic image transform processing on the images in the first subset and the second subset to update the images in the first subset and the second subset.

9. The person counting system as claimed in claim 8, wherein the image transform unit updates, by a perspective projection transformation algorithm, the images in the first subset and the second subset.

10. The person counting system as claimed in claim 7, wherein the posture estimating unit for each image to be estimated in the first subset, predicts, based on a position change of an image having the same person ID as the image to be estimated in continuous video frames, a moving direction of the image to be estimated;
calculates an included angle between the moving direction and an equator of the first video frame; and
determines, based on a predetermined correspondence between angles and posture patterns, a posture pattern corresponding to the included angle as the posture pattern of the image to be estimated.

11. The person counting system as claimed in claim 7, wherein the posture estimating unit stores each image in the first subset, the person ID and the posture pattern of the image, position information of the image in a video frame to which the image belongs, and timestamp information of the video frame to which the image belongs into a record having the same person ID and the same posture pattern as the image in the image library.

12. The person counting system as claimed in claim 11, wherein the person counting unit
recognizes, by a deep learning algorithm, each image to be recognized in the second subset and each image in the image library to obtain top N candidate images in a descending order of scores, N being an integer greater than 1; and
calculates, based on position information of the image to be recognized and the candidate images, position similarities;
calculates, based on timestamp information of the image to be recognized and the candidate images, time similarities; and
obtains similarity scores of the candidate images by calculating weighted sums of the respective position similarities and the respective time similarities, and determines the candidate image with the highest similarity score as the target image.

13. A person counting system comprising:
a memory storing computer-readable instructions; and
one or more processors configured to execute the computer-readable instructions such that the one or more processors are configured to
extract, from a first video frame of a video source, a group of images of persons to obtain a first image set, each image corresponding to one person;
divide the first image set into a first subset and a second subset based on whether a related image corresponding to an image in the first image set exists in a second image set, and reuse a person ID of the related image in the second image set for the corresponding image in the first subset, the second image set being a group of images of persons extracted from a video frame preceding the first video frame, a prediction position where the related image in the second image set is located in the first video frame matching an actual position where the corresponding image in the first image set is located in the first video frame;
estimate posture patterns of images in the first subset, and store the images in the first subset into an image library based on person IDs and the posture patterns; and
for each image in the second subset, select, from the image library, a target image whose similarity to the image in the second subset is highest, reuse a person ID of the target image for the corresponding image in the second subset when the similarity of the target image is greater than a predetermined threshold, and assign a new person ID to the corresponding image in the second subset and outputting a value of a counter for counting persons after incrementing the counter by 1 when the similarity of the target image is less than or equal to the predetermined threshold.

14. The person counting system as claimed in claim 13, wherein the video frames of the video source are panoramic video frames, and
wherein the one or more processors are configured to
perform panoramic image transform processing on the images in the first subset and the second subset to update the images in the first subset and the second subset.

15. The person counting system as claimed in claim 14, wherein the one or more processors are configured to
update, by a perspective projection transformation algorithm, the images in the first subset and the second subset.

16. The person counting system as claimed in claim 13, wherein the one or more processors are configured to
for each image to be estimated in the first subset, predict, based on a position change of an image having the same person ID as the image to be estimated in continuous video frames, a moving direction of the image to be estimated;
calculate an included angle between the moving direction and an equator of the first video frame; and
determine, based on a predetermined correspondence between angles and posture patterns, a posture pattern corresponding to the included angle as the posture pattern of the image to be estimated.

17. The person counting system as claimed in claim 13, wherein the one or more processors are configured to
store each image in the first subset, the person ID and the posture pattern of the image, position information of the image in a video frame to which the image belongs, and timestamp information of the video frame to which the image belongs into a record having the same person ID and the same posture pattern as the image in the image library.

18. The person counting system as claimed in claim 17, wherein the one or more processors are configured to recognize, by a deep learning algorithm, each image to be recognized in the second subset and each image in the image library to obtain top N candidate images in a descending order of scores, N being an integer greater than 1;

calculate, based on position information of the image to be recognized and the candidate images, position similarities;

calculate, based on timestamp information of the image to be recognized and the candidate images, time similarities; and obtain similarity scores of the candidate images by calculating weighted sums of the respective position similarities and the respective time similarities, and determine the candidate image with the highest similarity score as the target image.

\* \* \* \* \*